R. I. GILL.
MILK AERATOR, COOLER, AND PROTECTING DEVICE.
APPLICATION FILED JULY 7, 1919.
1,320,543. Patented Nov. 4, 1919.
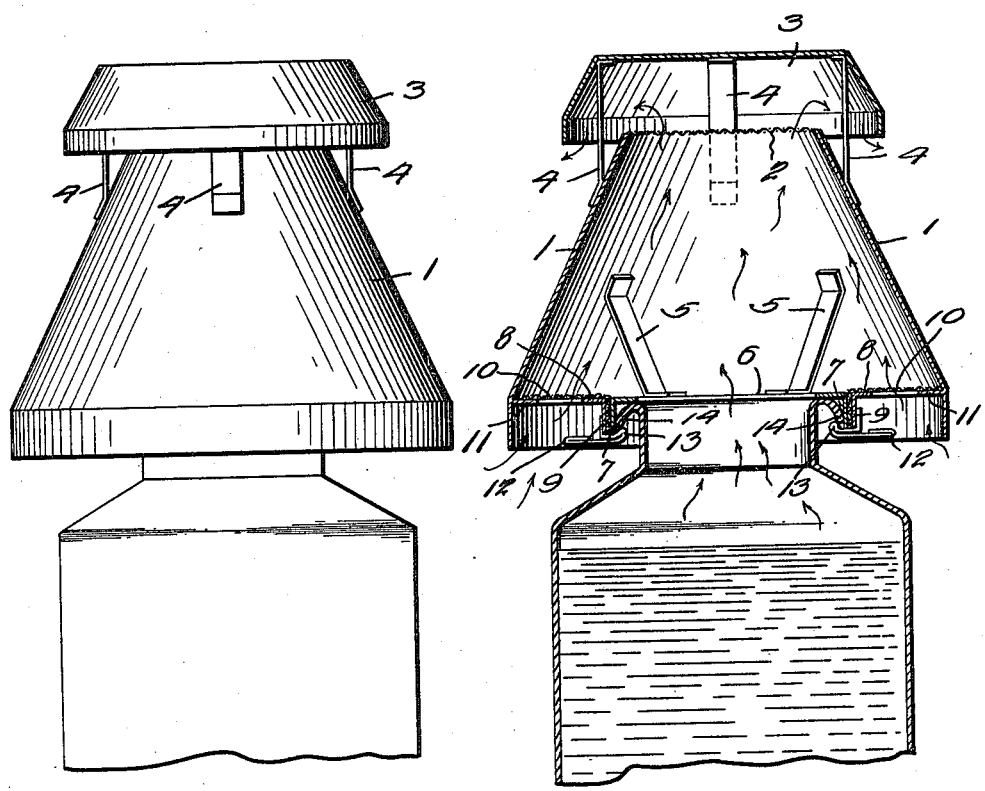
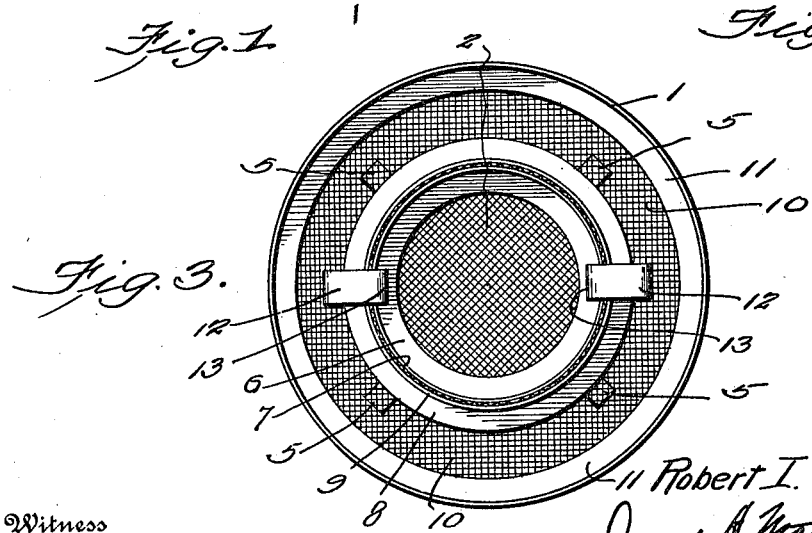

UNITED STATES PATENT OFFICE.

ROBERT I. GILL, OF PLATTEVILLE, WISCONSIN.

MILK AERATOR, COOLER, AND PROTECTING DEVICE.

1,320,543.  Specification of Letters Patent.  Patented Nov. 4, 1919.

Application filed July 7, 1919. Serial No. 308,963.

*To all whom it may concern:*

Be it known that I, ROBERT I. GILL, a citizen of the United States, residing at Platteville, in the county of Grant and State of Wisconsin, have invented a new and useful Milk Aerator, Cooler, and Protecting Device, of which the following is a specification.

The object of my invention is to provide a novel aerating cover for milk cans which is adapted to admit air to the milk and at the same time prevents insects from getting access to the milk. The device is used in the manufacture of cheese as it is necessary that milk for this purpose should be aerated. It is also my object to provide a cover which may be used to aerate and at the same time protect from dirt milk that is to be used in the manufacture of ice cream, or butter.

In the accompanying drawings illustrating my invention—

Figure 1 is a side elevation of the invention applied to a milk can, the can being shown on a somewhat reduced scale;

Fig. 2 is a vertical section of same; and

Fig. 3 is a bottom plan of the invention.

Referring to the accompanying drawings, I provide a suitable metal partially conical cover 1, across the upper portion of which is secured a screen 2 and to the lower portion of which is secured a screen 10 which is soldered to ring 11 on its outer annular portion and which has its inner annular portion secured between the annular flanges 7 and 9 of rings 6 and 8 respectively. Flanges 7 and 9 may have their ends bent to engage, or may be suitably soldered together. I provide braces 5 within cover 1, as shown in Fig. 2, to which ring 6 is attached. I further provide spring clips 12 soldered to flange 9, said clips having inner loops 13 adapted to engage the edge of a milk can cover.

Mounted on the upper portion of cover 1 are supports 4 carrying a space top cone or roof member 3, said member having its lower edge projecting down below the upper edge of cover 1, as shown in Fig. 2.

Clips 12 operate to prevent the device from being blown off by the wind or knocked off the can by animals at night when in use. These clips are made of suitable spring steel. The aerating effect of the device is indicated by arrows in Fig. 2. A draft is created by reason of the shape of the structure which causes free circulation of air and a rapid cooling of the milk, while the member or roof 3, and the overhanging cover 1 fully protect the milk from contamination.

The device is readily removed from the can by springing the clips 12 upward and lifting it off.

What I claim is:

1. In a device of the class described, the combination of a cover engaging over and spaced from the rim of a milk can, a ring within the cover and attached thereto, screening stretched from said ring to the cover, a screen stretched across the top of the cover, and a roof member mounted over the cover and having its sides positioned in spaced relation to the upper portion of the cover.

2. In a device of the class described, the combination of a partially conical cover, a partially conical roof member mounted over the cover and having its sides extending down in spaced relation to the upper portion of the cover, a screen extending across the upper portion of the cover, a second annular screen extending over the main lower portion of the cover, rings to which said screen is attached, braces securing one of the rings to the inner portion of the cover, and spring clips attached to one of the rings and adapted to releasably engage underneath the rim of a milk can.

ROBERT I. GILL.

Copies of this patent may be obtained for five cents each, by addressing the "Commissioner of Patents, Washington, D. C."